(12) United States Patent
Bennett

(10) Patent No.: US 9,188,149 B2
(45) Date of Patent: Nov. 17, 2015

(54) TAMPER-PROOF LOCKING FASTENER

(71) Applicant: Bruce A. Bennett, San Rafael, CA (US)

(72) Inventor: Bruce A. Bennett, San Rafael, CA (US)

( * ) Notice: Subject to any disclaimer, the term of this patent is extended or adjusted under 35 U.S.C. 154(b) by 0 days.

(21) Appl. No.: 14/175,539

(22) Filed: Feb. 7, 2014

(65) Prior Publication Data

US 2015/0226252 A1 Aug. 13, 2015

(51) Int. Cl.
*F16B 39/10* (2006.01)
*F16B 41/00* (2006.01)

(52) U.S. Cl.
CPC ............ *F16B 41/005* (2013.01); *F16B 39/105* (2013.01)

(58) Field of Classification Search
CPC ........ F16B 39/24; F16B 39/10; F16B 39/103; F16B 39/282; F16B 35/06; F16B 43/00; Y10S 411/91; Y10S 411/974; Y10S 411/999
USPC ......... 411/142, 148, 191, 195, 204, 208, 214, 411/215, 217, 219, 321, 372.5, 372.6, 373, 411/374, 985, 988, 993; 292/251; 70/229, 70/232

See application file for complete search history.

(56) References Cited

U.S. PATENT DOCUMENTS

| | | | |
|---|---|---|---|
| 550,905 A | 12/1895 | Case | |
| 744,335 A * | 11/1903 | Grant | F16B 39/10 411/204 |
| 854,590 A * | 5/1907 | Musser | F16B 39/08 411/197 |
| 1,009,352 A * | 11/1911 | Stutzman | B23B 27/16 407/103 |
| 1,145,256 A | 7/1915 | Mochow et al. | |
| 1,241,181 A * | 9/1917 | Wilhelm | F16B 39/108 411/201 |
| 1,432,243 A * | 10/1922 | Harris | 411/133 |
| 1,480,839 A * | 1/1924 | Robinson | A44B 1/30 24/105 |
| 2,002,403 A | 5/1935 | Kosma | |
| 2,400,318 A * | 5/1946 | Rosan | 411/373 |
| 3,259,161 A * | 7/1966 | Rosan | 411/109 |
| 3,351,116 A * | 11/1967 | Madsen | 411/102 |
| 3,498,173 A * | 3/1970 | Wright | 411/403 |
| 3,789,445 A * | 2/1974 | Frazier | B63B 22/18 114/125 |
| 4,018,111 A * | 4/1977 | Goldhaber | 81/436 |
| 4,253,509 A * | 3/1981 | Collet | 411/214 |
| 4,534,101 A * | 8/1985 | Rosan, Jr. | 29/432 |
| 4,734,001 A | 3/1988 | Bennett | |
| 4,735,533 A * | 4/1988 | Gallagher | F16K 35/00 411/119 |
| 4,875,395 A | 10/1989 | Alvarez | |
| D305,927 S | 2/1990 | Linderman et al. | |
| 4,906,150 A | 3/1990 | Bennett | |
| 4,938,644 A * | 7/1990 | Runels | 411/132 |
| 5,395,192 A | 3/1995 | Bennett | |
| 5,674,034 A | 10/1997 | Bennett | |
| 5,954,466 A | 9/1999 | Coffey et al. | |
| 6,017,177 A * | 1/2000 | Lanham | 411/410 |
| 6,027,293 A * | 2/2000 | Beemer et al. | 411/119 |
| 6,053,681 A * | 4/2000 | Mattershead | F16B 39/00 411/14 |
| 6,290,442 B1 * | 9/2001 | Peterkort | F16B 41/002 411/120 |
| 6,361,258 B1 * | 3/2002 | Heesch | 411/178 |
| 6,722,830 B2 * | 4/2004 | Forster et al. | 411/188 |

(Continued)

*Primary Examiner* — Gary Estremsky
(74) *Attorney, Agent, or Firm* — Edward S. Wright

(57) ABSTRACT

Locking fastener consisting of a threaded fastener having a head of noncircular contour, a lock plate having an opening in which the head of the fastener is received and constrained from rotating, and a retaining screw threadedly attached to the head of the fastener to retain the lock plate in position on the head. In the disclosed embodiments, the retaining screw is a tamper-proof security screw that requires a special tool or key for installation and removal. The fastener is particularly suitable for use in securing covers to utility boxes, and an adapter is included for use on existing boxes.

19 Claims, 2 Drawing Sheets

(56) References Cited

U.S. PATENT DOCUMENTS

| | | | |
|---|---|---|---|
| 6,948,782 B2 * | 9/2005 | Porter | B60B 37/04 301/105.1 |
| D517,404 S * | 3/2006 | Schluter | D8/387 |
| D524,637 S * | 7/2006 | Schluter | D8/382 |
| 7,708,509 B1 | 5/2010 | Bennett | |
| 7,708,510 B2 * | 5/2010 | Reimler | 411/166 |
| 8,016,535 B1 | 9/2011 | Roberts | |
| 2001/0041112 A1 * | 11/2001 | Hampson et al. | 411/402 |
| 2002/0110437 A1 | 8/2002 | Kirimoto | |
| 2005/0204875 A1 * | 9/2005 | Schluter | 81/436 |
| 2008/0145181 A1 * | 6/2008 | Lynes et al. | 411/403 |

* cited by examiner

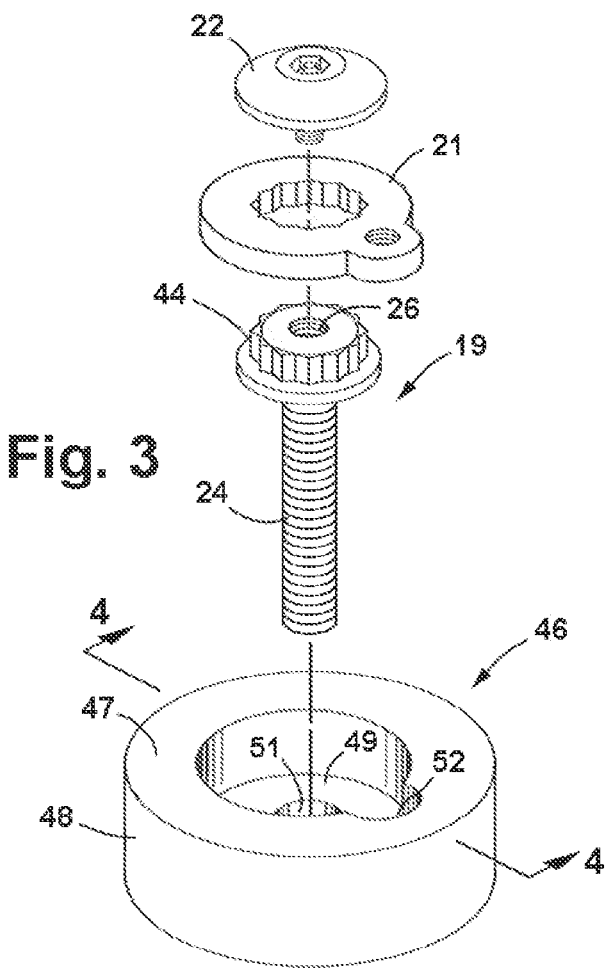
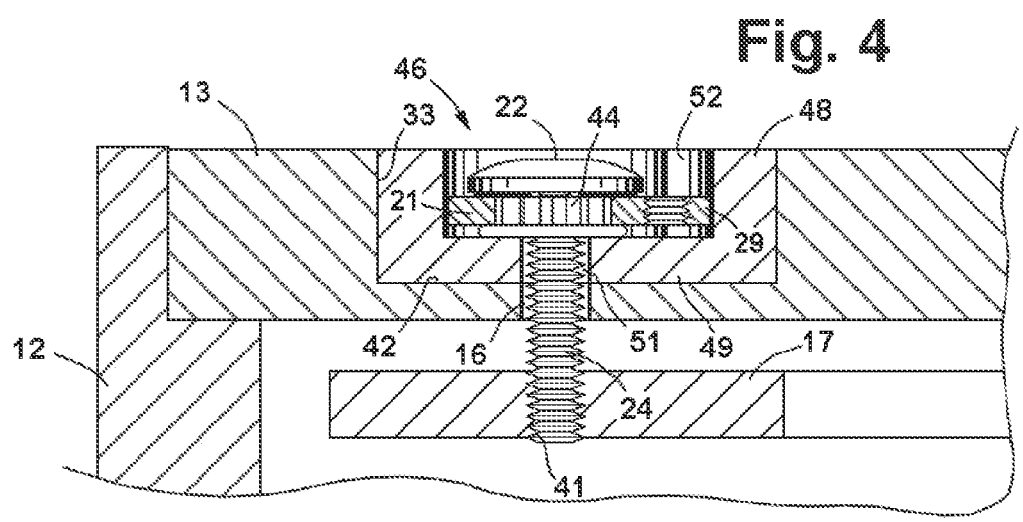

_US 9,188,149 B2_

TAMPER-PROOF LOCKING FASTENER

BACKGROUND OF THE INVENTION

1. Field of Invention

This invention pertains generally to locking fasteners and, more particularly, to a locking fastener which is tamper-proof.

2. Related Art

Locking fasteners are used in a variety of applications to prevent threaded fasteners from working loose due to vibration, and examples of such fasteners are found in U.S. Pat. Nos. 4,734,001, 4,906,150, 5,395,192, 5,674,034, and 7,708,509. Even in stationary structures such as underground utility boxes, vibrations in the earth can cause screws and the like to work loose.

With underground electrical boxes, there is a further problem of thieves removing the covers from such boxes and pulling hundreds of feet of copper wire from conduits running from the boxes.

OBJECTS AND SUMMARY OF THE INVENTION

It is, in general, an object of the invention to provide a new and improved locking fastener.

Another object of the invention is to provide a locking fastener of the above character which overcomes the limitations and disadvantages of locking fasteners heretofore provided.

These and other objects are achieved in accordance with the invention by providing a locking fastener which comprises a threaded fastener having a head of noncircular contour, a lock plate having an opening in which the head of the fastener is received and constrained from rotating, and a retaining screw threadedly attached to the head of the fastener to retain the lock plate in position on the head.

In the disclosed embodiments, the retaining screw is a tamper-proof security screw that requires a special tool or key for installation and removal. The fastener is particularly suitable for use in securing covers to utility boxes, and an adapter is included for use on existing boxes.

BRIEF DESCRIPTION OF THE DRAWINGS

FIG. 3 is an exploded isometric view of another embodiment of tamper-proof locking fastener incorporating the invention.

FIG. 4 is a cross-sectional view taken along line 4-4 of FIG. 3, showing the fastener in an assembled state.

DETAILED DESCRIPTION

Figure 1:
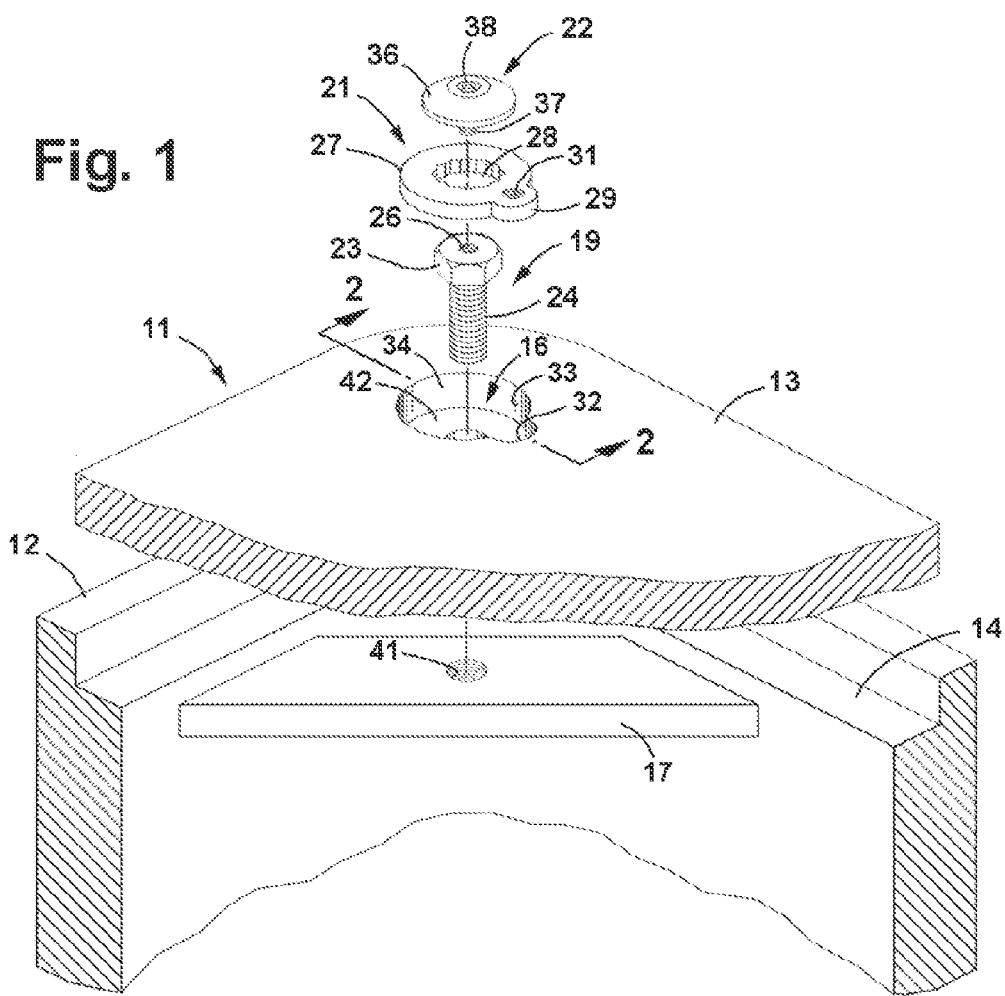
FIG. 1 is an exploded isometric view of one embodiment of tamper-proof locking fastener incorporating the invention.
Figure 2:
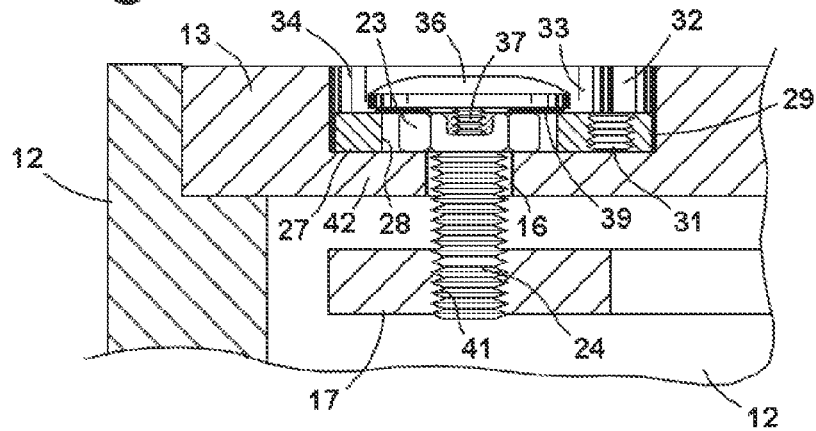
FIG. 2 is an enlarged cross-sectional view taken along line 2-2 of FIG. 1, showing the fastener in an assembled state.

In FIGS. 1 and 2, the invention is illustrated in conjunction with an underground enclosure 11 of a type commonly utilized for housing electrical equipment. This enclosure has a generally rectangular, five-sided body or box 12 and a removable lid or cover 13. The cover fits into a recessed area toward the top of the box, with the peripheral portion of the cover resting on a shoulder or ledge 14 that extends about the inner periphery of the box. The cover is secured to the box by cap screws or bolts which pass through counterbored openings 16 near diagonally opposite corners of the cover and are threadedly received in metal brackets 17 in corresponding corners of the box. Enclosures of this type are typically cast of a material such as polymer concrete, and in the embodiment illustrated, the end portions of the metal brackets are cast into the side wall of the box.

The fastener comprises a cap screw or bolt 19, a lock plate 21, and a retaining screw 22. The cap screw has a hexagonal head 23 and a threaded shank 24, with an axially extending threaded bore 26 opening through the upper side of the head.

The lock plate has a circular body 27, with a 12-point central opening 28 and a positioning tab 29. The opening is such that when the lock plate is placed on the head of the cap screw, the head is received in the opening in a non-rotational locking relationship. The tab extends radially or laterally from the circular body for abutting engagement with an object to prevent rotation of the lock plate. The plate also has a small threaded opening 31 at the base of the tab for receiving a tool (not shown) for use in placing the lock plate on the head of a screw in a recessed opening where fingers cannot reach.

In the embodiment illustrated, an axially extending slot 32 having a contour corresponding to tab 29 opens through the side wall 33 of the counterbored section 34 of the opening 16 in cover 13.

Retaining screw 22 has a flanged head 36 of greater diameter than the opening in the lock plate and a threaded shank 37 that is received in the threaded bore in the head of the cap screw. The retaining screw is tamper-proof in that it has a socket 38 in the head that requires a special tool or key (not shown) for insertion and removal of the screw. Cleats 39 are provided on the under side of the head for binding engagement with a surface against which the screw is tightened.

In use, cover 13 is positioned on enclosure box 12 with opening 16 aligned with a threaded opening 41 in bracket 17. Cap screw 19 is inserted into opening 16 and threaded into opening 41, then tightened to secure the cover to the box, with the head of the screw bearing against the bottom wall 42 of counterbore 34. Lock plate 21 is then inserted into the counterbore, with the head of the screw being received in the opening 28 in the plate and tab 29 extending into slot 32 to prevent rotation of the lock plate and screw. Retaining screw 22 is then installed in the threaded bore 26 in the head of the cap screw and tightened to bring cleats 39 into binding engagement with the top surface of the cap screw and/or lock plate, depending upon the relative thicknesses of the two.

Once installed, the locking fasteners prevent the screws that secure the cover to the box from working loose, and the tamper-proof retaining screws prevent the cover screws from being removed without a special tool or key that matches the drive sockets in the heads of the retaining screws.

The embodiment illustrated in FIGS. 3 and 4 is generally similar to the embodiment of FIGS. 1 and 2, and like reference numerals designate corresponding elements in the two embodiments. Here again, the fastener includes a cap screw or bolt 19, a lock plate 21 that prevents the cap screw from working loose, and a tamper-proof retaining screw 22 that keeps the lock plate on the cap screw and the fastener secured in place. In this embodiment, however, the cap screw has a 12-point flanged head 44 rather than a 6-point hexagonal head.

In addition to the cap screw, lock plate and retaining screw, the embodiment of FIGS. 3 and 4 also includes an insert or adapter 46 for use in counterbores which do not have a slot for a lock tab. This allows the fastener to be used with existing enclosures that do not have a tab slot as well as enclosures which are manufactured with the slot or modified by milling a slot into them.

The insert has a generally cylindrical body 47 with an annular side wall 48 and a bottom wall 49. A clearance hole 51 for the shank of the cap screw is formed in the bottom wall, and an axially extending slot 52 opens inwardly through the side wall for receiving the tab on the lock plate. The insert is fabricated of a relatively rigid plastic material and has a diameter and length corresponding to the diameter and depth of the counterbore in which the fastener is to be installed.

In use, the insert is press fit or hammered into the counterbore and thereby constrained against rotation. The cap screw is then passed through the openings in the bottom walls of the insert and counterbore, threaded into the enclosure box and tightened to secure the cover to the box, with the head of the screw bearing against the bottom wall of the insert and clamping it against the bottom wall of the counterbore. The lock plate and retaining screw are then installed in the manner described above to prevent loosening of the cap screw and unauthorized removal of the cover.

The invention has a number of important features and advantages. The retaining screw provides a straightforward yet highly effective way of keeping the lock plate on the cap screw to prevent the cap screw from loosening, and being a tamper-proof security screw, the retaining screw also prevents unauthorized removal of the fastener.

While the invention has been described with specific to counterbore screws and bolts, it will be understood that the retainer can be employed with other types of locking fasteners including teardrop-shaped lock plates and lock plates that bridge between two or more fasteners.

It is apparent from the foregoing that a new and improved tamper-proof locking fastener has been provided. While only certain presently preferred embodiments have been described in detail, as will be apparent to those familiar with the art, certain changes and modifications can be made without departing from the scope of the invention as defined by the following claims.

The invention claimed is:

1. A tamper-proof locking fastener, comprising a threaded fastener having an externally threaded body and a head of noncircular contour and greater diameter than the body, a lock plate having an opening in which the head of the threaded fastener is received and constrained from rotating, and a retaining screw with a tamper-proof head that requires a key for removal, the retaining screw being threadedly attached to the head of the threaded fastener to retain the lock plate in position on the head of the threaded fastener.

2. The tamper-proof locking fastener of claim 1 wherein the lock plate has a circular body with a radially projecting tab that is adapted to be received in an axially extending slot in a wall of a counterbored opening in which the tamper-proof locking fastener is employed.

3. The tamper-proof locking fastener of claim 1 including an insert that is adapted to be installed in an opening in a part with which the tamper-proof locking fastener is employed, the insert having an opening in which the threaded fastener is received with a cross-sectional contour that prevents rotation of the lock plate within the insert.

4. The tamper-proof locking fastener of claim 3 wherein the lock plate has a circular body with a radially extending tab, and the insert has a cylindrical side wall with an axially extending slot in which the tab is received.

5. The tamper-proof locking fastener of claim 1 wherein the tamper-proof head of the retaining screw is of greater diameter than the opening in the lock plate.

6. The tamper-proof locking fastener of claim 5 wherein the retaining screw has cleats on the underside of its head which engage the lock plate and/or the head of the threaded fastener to prevent loosening of the retaining screw.

7. A tamper-proof locking fastener installed on an enclosure having a removable cover with a counterbored opening, comprising a threaded fastener having a head of noncircular contour that is disposed in a counterbore at the outer end of the opening and a shank that extends through the remainder of the opening and is threadedly received in the enclosure, a lock plate positioned about the head of the threaded fastener to prevent rotation of the threaded fastener within the opening, and a retaining screw with a tamper-proof head that requires a key for removal, the retaining screw being threadedly attached to the head of the threaded fastener to retain the lock plate in position on the head of the threaded fastener.

8. The tamper-proof locking fastener of claim 7 wherein the lock plate interfits with a wall of the counterbore to prevent rotation of the lock plate, and the lock plate has an opening in which the head of the threaded fastener is non-rotatively received.

9. The tamper-proof locking fastener of claim 8 wherein the lock plate has a circular body with a radial tab that extends into an axially extending slot in the wall of the counterbore.

10. The tamper-proof locking fastener of claim 7 including an insert which is installed in the counterbore and interfits with the lock plate to prevent rotation of the lock plate, and the lock plate has an opening in which the head of the threaded fastener is non-rotatively received.

11. The tamper-proof locking fastener of claim 10 wherein the lock plate has a circular body with a radially extending tab, and the insert has a cylindrical side wall with an axially extending slot in which the tab is received.

12. The tamper-proof locking fastener of claim 7 wherein the tamper-proof head of the retaining screw is of greater diameter than the opening in the lock plate.

13. The tamper-proof locking fastener of claim 12 wherein the retaining screw has cleats on the underside of its head which engage the lock plate and/or the head of the threaded fastener to prevent loosening of the retaining screw.

14. A locking fastener, comprising a threaded fastener having an externally threaded body and a head of noncircular contour and greater diameter than the body with a threaded bore opening through the upper side of the head, a lock plate having an opening in which the head is received and constrained from rotating, and a retaining screw threaded into the bore to retain the lock plate on the head.

15. The locking fastener of claim 14 wherein the lock plate has a circular body with a radially projecting tab that is adapted to be received in an axially extending slot in a wall of a counterbored opening in which the fastener is employed.

16. The locking fastener of claim 14 including an insert that is adapted to be installed in an opening in a part with which the locking fastener is employed, the insert having an opening in which the threaded fastener is received with a cross-sectional contour that prevents rotation of the lock plate within the insert.

17. The locking fastener of claim 16 wherein the lock plate has a circular body with a radially extending tab, and the insert has a cylindrical side wall with an axially extending slot in which the tab is received.

18. The locking fastener of claim 14 wherein the retaining screw has a head of greater diameter than the opening in the lock plate.

19. The locking fastener of claim 14 wherein the retaining screw has cleats on the underside of its head which engage the lock plate and/or the head of the threaded fastener to prevent loosening of the retaining screw.

* * * * *